United States Patent
Drabon et al.

(10) Patent No.: US 8,091,763 B2
(45) Date of Patent: Jan. 10, 2012

(54) METHOD OF MAKING A CONTROL ARM

(75) Inventors: Rodscha Drabon, Salzkotten (DE); Hendrik Korinth, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/905,335

(22) Filed: Oct. 15, 2010

(65) Prior Publication Data
US 2011/0089223 A1    Apr. 21, 2011

(51) Int. Cl.
*B23K 20/12* (2006.01)
(52) U.S. Cl. .................. 228/114.5; 228/112.1; 228/114
(58) Field of Classification Search ............... 228/112.1, 228/2.1
See application file for complete search history.

(56) References Cited

U.S. PATENT DOCUMENTS

| | | | | |
|---|---|---|---|---|
| 3,238,612 A | * | 3/1966 | Hamilton | 156/104 |
| 3,337,108 A | * | 8/1967 | Taylor | 228/2.3 |
| 3,384,396 A | * | 5/1968 | Hamilton | 403/126 |
| 6,913,273 B2 | | 7/2005 | Drabon et al. | |

FOREIGN PATENT DOCUMENTS

DE    102 55 049 B4    6/2003

* cited by examiner

*Primary Examiner* — Alicia Chevalier
*Assistant Examiner* — Megha Mehta
(74) *Attorney, Agent, or Firm* — Henry M. Feiereisen; Ursula B. Day

(57) ABSTRACT

In a method of making a control arm, a middle piece is held in a mounting of a rotary friction welding machine so as to be constraint against rotation and movement in an axial direction. End pieces are rotated in synchronism on opposite ends of the middle piece so as to rub friction welding sites of the end pieces and friction welding sites on the middle piece on one another to initiate a friction welding process. After releasing the middle piece, the friction welding sites are compressed through axial displacement of at least one of the end pieces.

9 Claims, 1 Drawing Sheet ure of the middle piece is abruptly released, causing the middle piece to rotate freely in unison with the end pieces. While the rotation continues unabatedly, at least one of the end pieces is moved axially to compress friction welding sites to thereby conclude
METHOD OF MAKING A CONTROL ARM

CROSS-REFERENCES TO RELATED APPLICATIONS

This application claims the priority of German Patent Application, Serial No. 10 2009 049 966.0-45, filed Oct. 19, 2009, pursuant to 35 U.S.C. 119(a)-(d), the content of which is incorporated herein by reference in its entirety as if fully set forth herein.

BACKGROUND OF THE INVENTION

The present invention relates to a method of making a control arm, in particular for use in an undercarriage of a motor vehicle.

The following discussion of related art is provided to assist the reader in understanding the advantages of the invention, and is not to be construed as an admission that this related art is prior art to this invention.

Wheel suspensions of vehicles are typically comprised of single control arms, for example transverse control arms, diagonal control arms, and longitudinal control arms. As components of the vehicles, they connect the wheel receptacles with the chassis or directly with the vehicle body. In the form of struts, they have connection elements at their ends in order to connect with the vehicle the parts of the wheel suspension that have to be supported movable as a result of rotation movement, decoupling, and suspension behavior. Rubber-metal bearings are typically used as connection elements. In view of their multiple uses in the vehicle, control arms are considered mass products which for economical reasons should be manufactured quickly and without the need for refinishing operations. Still, in particular as a component of the undercarriage, control arms must be manufactured with high dimensional precision.

It would therefore be desirable and advantageous to provide an improved method of making a control arm to obviate prior art shortcomings.

SUMMARY OF THE INVENTION

According to one aspect of the present invention, a method of making a control arm includes the steps of restraining a middle piece in a mounting of a rotary friction welding machine so as to be constraint against rotation and movement in an axial direction, rotating end pieces in synchronism on opposite ends of the middle piece so as to rub friction welding sites of the end pieces and friction welding sites on the middle piece on one another to initiate a friction welding process, releasing the mounting to liberate the middle piece, and compressing the friction welding sites through axial displacement of at least one of the end pieces.

The present invention resolves prior art shortcomings by connecting the middle piece and the end pieces through friction welding. The middle piece is held fixed in place in a mounting of a friction welding machine so as to be prevented from rotating and from executing a movement in axial direction. At the same time, the end pieces are clamped in opposite chucks of the friction welding machine and then moved axially toward the fixed middle piece while rotating in synchronism until the end pieces rub on the middle piece. At the conclusion of the friction process, the fixed securement of the middle piece is abruptly released, causing the middle piece to rotate freely in unison with the end pieces. While the rotation continues unabatedly, at least one of the end pieces is moved axially to compress friction welding sites to thereby conclude the joining process and establishing a proper distance between the end pieces. Of course, the end pieces may be positioned at the beginning at various angular offsets relative to one another because the independently controllable chucks can be repositioned about the rotation axis in any relative angular disposition.

According to another advantageous feature of the present invention, welding seams at the friction welding sites can be removed while the rotating end pieces are held in the chucks. The welding seams are produced during joining of the end pieces to the middle piece and removed in a refinishing step while the joined end pieces and middle piece rotate and held in the same chucking of the rotary friction welding machine. In this way, the continuous rotation is effectively utilized over several operating steps so that great masses, for example the chuck of the rotary friction welding machine, need to be accelerated and decelerated only at the beginning and end of the entire process.

According to another advantageous feature of the present invention, neck-like projections can be formed between start of rotation of the end pieces and subsequent friction step on the end pieces via which the end pieces are friction-welded with the middle piece. As a result, the middle piece can be precisely positioned and centered between the end pieces. Of course, it is certainly possible to form the end pieces with the neck-like projections before being placed into the chuck of the rotary friction welding machine.

According to another advantageous feature of the present invention, the end pieces can be formed with bearing elements. In this way, the thus manufactured control arm can be installed at its intended site, e.g. via detachable connection elements. The bearing elements may be formed after friction welding and thus on the finished control arm, or also prior to friction welding when the end pieces are not as of yet connected with the middle piece. Suitably, the bearing elements may be configured as rubber-metal bearings. Of course, the bearing elements may be incorporated into the end pieces in many different ways, for example by press-fitting. Currently preferred is, however, to vulcanize the bearing elements into the end pieces. As a result, there is no need to press-fit pre-manufactured bearing elements into the end pieces. The bearing elements may also be designed as ball joints, thereby eliminating the need for vulcanization. In this case, the end pieces may form the bearing socket for the ball joint for placement of the ball. It is, however, also possible to press-fit pre-manufactured joints comprised of bearing socket and ball, into the end pieces. Press-fitting may hereby take place prior to the friction welding process.

According to another advantageous feature of the present invention, the middle piece can be configured as a tubular structure. This type of middle piece is simple, cost-efficient, and easy to handle.

A method according to the invention results in a novel and economical option to manufacture a control arm by friction welding. Eliminating unnecessary clamping and unclamping steps of components during the manufacturing process renders the process efficient and permits a simultaneous and thus significantly shortened joining of both end pieces with the middle piece. Operating steps are decreased and a reliable placement of both end pieces in the synchronously rotating chuck of the friction welding device is attained. The individual components of the control arm are precisely positioned, accompanied by a simplification of the production. There is no need to recalibrate the components to be joined as the components are held in place throughout so that the overall process is less complicated and results in shorter clock times. As the process steps of joining and refinishing of the friction welding sites does not require a repositioning of the components of the control arm, the production costs are significantly reduced. Another benefit relates to energy conservation because acceleration and deceleration of large rotating masses, for example chuck, are limited to the beginning and end of the manufacturing process as there is no need to rechuck. Effectiveness of the friction welding is therefore significantly increased.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
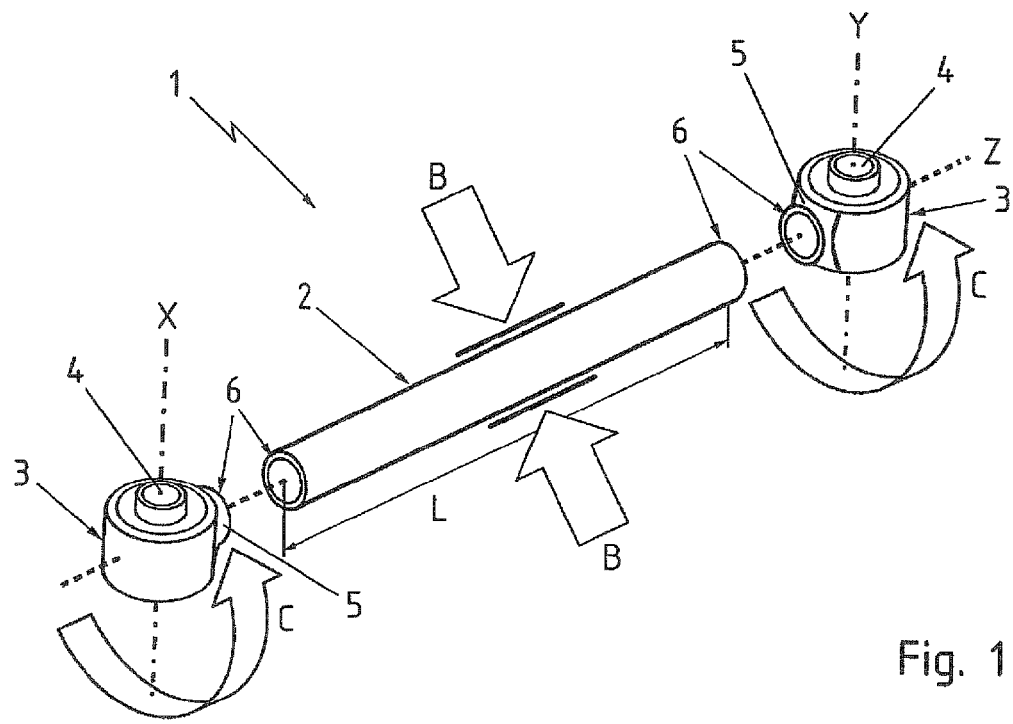
FIG. 1 is a top perspective exploded view of a control arm according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top perspective exploded view of a control arm according to the present invention, generally designated by reference numeral 1. The control arm 1 includes a tubular middle piece 2 defined by a length L plus overmeasure, and two end pieces 3 for attachment to opposite ends of the middle piece 2, respectively. The end pieces 3 have a generally straight circular-cylindrical cross section with a rotation-symmetric through opening in the direction of the length axes X, Y. The thus remaining wall thickness corresponds at the thinnest spot approximately to one and a half of the wall thickness of the middle piece 2. The height of the end piece 3, which is cut straight in perpendicular relation to its length axis X, Y, corresponds approximately to the outer diameter of the tubular middle piece 2.

Disposed within the through opening of each of the end pieces 3 is a bearing element 4. The bearing element 4 includes a continuous tubular bushing received in the center of the through opening of the end piece 3 in the direction of the length axis X, Y and having ends extending beyond the end piece 3. The difference between the outer diameter of the bushing and the inner diameter of the end piece 3 corresponds approximately to the wall thickness of the end piece 3.

In order to permanently connect the bushing of the bearing element 4 with the end piece 3, the bushing is vulcanized into the through opening of the end piece 3.

Each end piece 3 is provided on its circumference with a neck-like projection 5 which extends in parallel relation to the length axis X, Y and tangentially to the outer circumference of the end piece 3 and has a substantially circular planar surface. The height of the neck-like projection 5 in perpendicular relation to the length axis X, Y of the end piece 3 corresponds approximately to the wall thickness of the end piece 3. The outer geometry of the neck-like projection 5 merges into the outer geometry of the end piece 3.

The circular outer diameter of the neck-like projection 5 corresponds to the outer diameter of the tubular middle piece 3. The neck-like projection 5 has an end face formed in length direction Z with a short tapered cross sectional step which is defined by an outer diameter that decreases in size to the inner diameter of the middle piece 2.

The middle piece 2 has just shy of each of its open ends, cut perpendicular to the length axis Z, a friction welding site 6 about the wall circumference. Likewise, the neck-like projections 5 have end faces that have also a respective friction welding site 6 in the area of the cross sectional step between the outer diameter of the neck-like projection 5 and the taper, with the friction welding sites 6 of the middle piece 2 and the friction welding sites 6 of the end pieces 3 forming mirror images of another.

Figure 2:
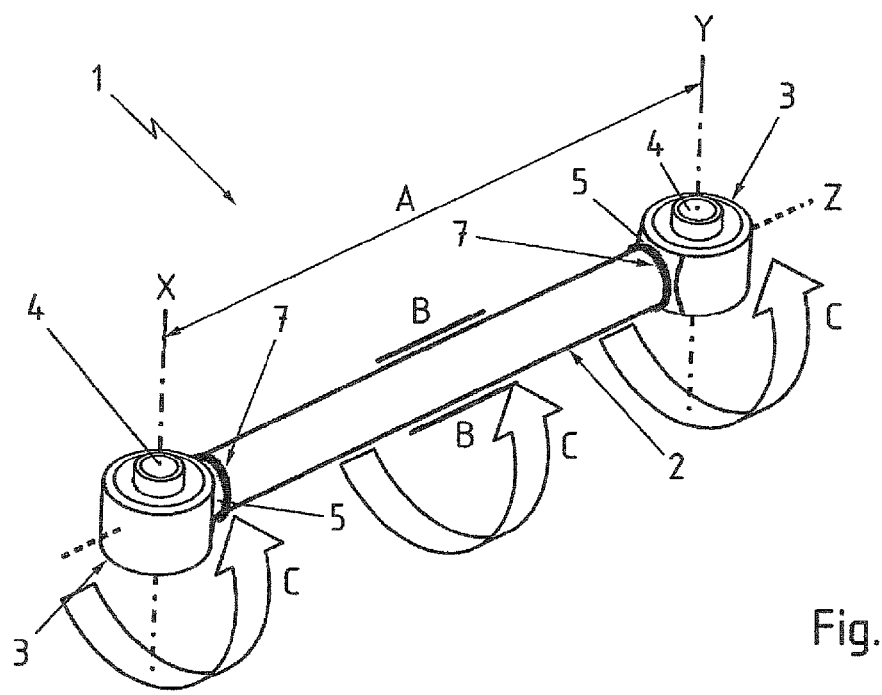
FIG. 2 is a top perspective view of the control arm in assembled state.

FIG. 2 shows a top perspective view of the control arm 1 in assembled state, with the middle piece 2 positioned as connection piece between the end pieces 3 on the respective ends of the middle piece 2 and connected to the end pieces 3 via the friction welding sites 6. The length axes X, Y of both end pieces 3 extend axis-parallel at a distance A relative to one another. Welding seams 7 in the form of outwardly accumulated material radially about the friction welding sites 6 are created in the contact area of the friction welding sites 6 of the middle piece 2 and the two end pieces 3.

The mode of production of the control arm 1 is as follows: A tubular middle piece 2 is cut to size from a pipe string to a length L plus overmeasure. The middle piece 2 is then transferred to a mounting B of an otherwise unillustrated rotary friction welding machine for securement such that the middle piece 2 is prevented from rotating and prevented from moving in the direction of its length axis Z. The ends of the middle piece 2 remain freely accessible and are thus not covered by the mounting B.

Although not shown in detail, the rotary friction welding machine has two chucks in opposition to one another, with the chucks disposed on the same rotation axis and constructed to enable a rotation in synchronism in a same direction, as indicated by arrow C. The length axis Z of the middle piece 2 in the mounting B extends precisely between the two chucks and thus on their common rotation axis.

Placed in both chucks are the end pieces 3, respectively. Each end piece 3 is cut to size from a profile element of corresponding cross sectional shape and provided beforehand with a neck-like projection 5 and a bearing element 4 that has been vulcanized into the end piece 3. The end pieces 3 are clamped by the chucks in such a manner that the length axis Z of the neck-like projections 5 coincides with the rotation axis of the chucks, with the neck-like projections 5 protruding out of the chucks.

After being clamped in the chucks, the end pieces 3 are caused to rotate about the length axis Z of the neck-like projections 5 in synchronism and in a same direction C.

In a next step, the rotating end pieces 3 are moved jointly at the same time in the direction of the length axis Z toward one another to approach the middle piece 2 and its ends until the friction welding sites 6 of the end pieces 3 and of the middle piece 2 touch each other. The fixed securement of the middle piece 2 causes the friction welding sites 6 of the middle piece 2 and end pieces 3 to rub against one another, thereby initiating the friction welding process.

Heat generated by the friction between the friction welding sites 6 causes a softening of material that surrounds the friction welding sites 6. As soon as the material is soft enough, the fixed securement of the middle piece 2 in the mounting B is abruptly released so that the middle piece 2 is liberated and able to accelerate about its length axis Z and to rotate in synchronism between the two end pieces 3 about the own axis. In other words, the joined middle piece 2 and end pieces 3 rotate in unison about the axis Z in the direction C.

After releasing the securement of the middle piece 2, the friction welding sites 6 are compressed by moving at least one of the chucks with the clamped end piece 3 during the rotation about the axis Z towards the other opposing chuck. The compression step is terminated as soon as both length axes X, Y of the end pieces 3 have reached the end measure A relative to one another.

During compression, the soft material is displaced in the area of the friction welding sites 6, causing material to accumulate to form visible welding seams 7. As the temperature reached during friction drops, the components of the control arm 1, i.e. middle piece 2 and end pieces 3, are welded together at the friction welding sites 6.

After the components have been compressed, refinishing is implemented while the end pieces 3 with interconnecting middle 2 are held by the same chucks. In other words, while the control arm 1 rotates without interruption in the rotation as a unit between both chucks, the welding seams 7 created during compression in the area of the friction welding sites 6 are removed The rotation of the chucks is terminated only after the middle piece 2 has been joined with the end pieces 3 and the welding seams 7 have been removed. The thus finished control arm 1 can then be removed and the process can start anew.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making a control arm, comprising the steps of:
   restraining a middle piece in a mounting of a rotary friction welding machine so as to be constraint against rotation and movement in an axial direction;
   rotating end pieces in synchronism on opposite ends of the middle piece so as to rub friction welding sites of the end pieces and friction welding sites on the middle piece on one another to initiate a friction welding process and thereby loin the end pieces with the middle piece;
   releasing the mounting to liberate the middle piece from the mounting and thereby cause the middle piece to rotate in unison with the end pieces; and
   compressing the friction welding sites through axial displacement of at least one of the end pieces while the middle piece and the end pieces continue to rotate.

2. The method of claim 1, further comprising the step of removing welding seams at the friction welding sites while the end pieces are held in a same chucking of the rotary friction welding machine.

3. The method of claim 1, further comprising the step of forming neck-like projections on the end pieces via which the end pieces are friction-welded with the middle piece.

4. The method of claim 1, further comprising the step of forming the end pieces with bearing elements.

5. The method of claim 4, wherein the bearing elements are rubber-metal bearings.

6. The method of claim 4, further comprising the step of vulcanizing the bearing elements before the friction welding process.

7. The method of claim 4, further comprising the step of press-fitting the bearing elements into the end pieces before the friction welding process.

8. The method of claim 4, wherein the bearing elements are configured as ball joints.

9. The method of claim 1, wherein the middle piece is a tubular structure.

\* \* \* \* \*

UNITED STATES PATENT AND TRADEMARK OFFICE
CERTIFICATE OF CORRECTION

| | |
|---|---|
| PATENT NO. | : 8,091,763 B2 |
| APPLICATION NO. | : 12/905335 |
| DATED | : January 10, 2012 |
| INVENTOR(S) | : Rodscha Drabon and Hendrik Korinth |

It is certified that error appears in the above-identified patent and that said Letters Patent is hereby corrected as shown below:

Column 6, claim 1, line 13, replace

"loin" with --join--

Signed and Sealed this
Twentieth Day of March, 2012

David J. Kappos
*Director of the United States Patent and Trademark Office*